United States Patent [19]

Lentz et al.

[11] Patent Number: 5,046,175

[45] Date of Patent: Sep. 3, 1991

[54] METHOD OF DETECTING CLUTCH TIE-UP DURING TRANSMISSION SHIFTING

[75] Inventors: Carl A. Lentz, Mooresville; Christopher R. Wiles, Indianapolis, both of Ind.; John A. Hibner, Coldwater, Ohio; Jon M. Huber, Plainfield, Ind.

[73] Assignee: General Motors Corporation, Detroit, Mich.

[21] Appl. No.: 463,562

[22] Filed: Jan. 11, 1990

[51] Int. Cl.⁵ ...................... B06K 41/08; G60F 15/50
[52] U.S. Cl. .................... 364/424.1; 74/866
[58] Field of Search ............... 364/424.1; 74/866, 867; 192/3.30, 3.31

[56] References Cited

U.S. PATENT DOCUMENTS

| | | | |
|---|---|---|---|
| 4,494,423 | 1/1985 | McCarthy et al. | 74/867 |
| 4,707,789 | 11/1987 | Downs et al. | 364/424.1 |
| 4,785,689 | 11/1988 | Iwatsuki et al. | 74/866 |
| 4,843,551 | 6/1989 | Milunas | 364/424.1 |
| 4,940,122 | 7/1990 | Fujieda | 192/3.31 |

Primary Examiner—Salvatore Cangialosi
Attorney, Agent, or Firm—Mark A. Navarre

[57] ABSTRACT

The disengagement of the off-going clutch is monitored to determine as early as possible if there is a clutch tie-up due to failure to disengage. Beginning at the initial clutch release command, the turbine speed and output speed are used to determine if clutch slip has occurred and a pass signal is given if slip occurs in several consecutive control loops. Beginning a preset time after the command to fully exhaust the clutch, the number of no-slip conditions are counted. A fail signal is given when a set number of no-slip conditions are counted.

6 Claims, 7 Drawing Sheets

| RANGE | CLUTCHES APPLIED | | | | |
|---|---|---|---|---|---|
| | C1 | C2 | C3 | C4 | C5 |
| FWD 1 | X | | | | X |
| 2 | X | | | X | |
| 3 | X | | X | | |
| 4 | X | X | | | |
| 5 | | X | X | | |
| 6 | | X | | X | |
| REV 1 | | | X | | X |

METHOD OF DETECTING CLUTCH TIE-UP DURING TRANSMISSION SHIFTING

FIELD OF THE INVENTION

This invention relates to a method of determining whether there is clutch tie-up during shifting of an automatic transmission.

BACKGROUND OF THE INVENTION

Generally, a motor vehicle automatic transmission includes a number of gear elements coupling its input and output shafts, and a related number of torque establishing devices, such as clutches and brakes which are selectively engageable to activate certain gear elements for establishing a desired speed ratio between the input and output shafts. The brake can be of the band type or disk type; engineering personnel in the automotive art refer to disc type brakes in transmissions as "clutches" or "reaction clutches". As used herein, the terms "clutches" and "torque transmitting devices" will be used to refer to brakes as well as clutches.

The input shaft is connected to the vehicle engine through a fluid coupling, such as a torque converter, and the output shaft is connected directly to the vehicle wheels. Shifting from one forward range to another or to reverse generally involves releasing or disengaging the clutch (off-going) associated with the current range and applying or engaging the clutch (on-coming) associated with the desired range. Shifting from a range to neutral also involves disengaging an off-going clutch.

The speed ratio is defined as the transmission input speed or turbine speed divided by the output speed. Thus, a low gear range has a high speed ratio and a higher gear range has a lower speed ratio. To perform an upshift, a shift is made from a high speed ratio to a low speed ratio. In the type of transmission involved in this invention, the upshift is accomplished by disengaging a clutch associated with the higher speed ratio and engaging a clutch associated with the lower speed ratio to thereby reconfigure the gear set to operate at the lower speed ratio. Shifts performed in the above manner are termed clutch-to-clutch shifts and require precise timing in order to achieve high quality shifting.

To insure success of the clutch-to-clutch shifts as well as shifts to neutral, it is desirable to monitor the progress of the shift. If an off-going clutch experiences "tie-up", or fails to disengage at the desired time, the shift will not succeed and it is undesirable to attempt completion of the shift. Thus, timely information on shift progress can be used to determine whether a shift should be aborted.

SUMMARY OF THE INVENTION

It is therefore an object of the invention to provide a method of detecting whether clutch tie-up is occurring during a shift.

It is another object to provide a method of attaining a decision on tie-up as soon as possible in the shift progress.

The invention is carried out by determining from turbine and output speeds whether off-going clutch slip occurs after an initial clutch release command and issue a pass indication if a number of consecutive slips are detected, and determining whether slip fails to occur after a command for complete pressure exhaust and issue a tie-up indication if slip fails to occur a set number of times.

BRIEF DESCRIPTION OF THE DRAWINGS

The above and other advantages of the invention will become more apparent from the following description taken in conjunction with the accompanying drawings wherein like references refer to like parts and wherein:

FIG. 1b is a diagram illustrating the clutch engagements required to establish the various speed ratios of the transmission depicted in FIG. 1a.

FIGS. 2 and 3a-3b are flow diagrams representative of computer program instructions executed by the computer based controller of FIG. 1a in carrying out the shift control of the transmission.

DETAILED DESCRIPTION OF THE INVENTION

Figure 1A:
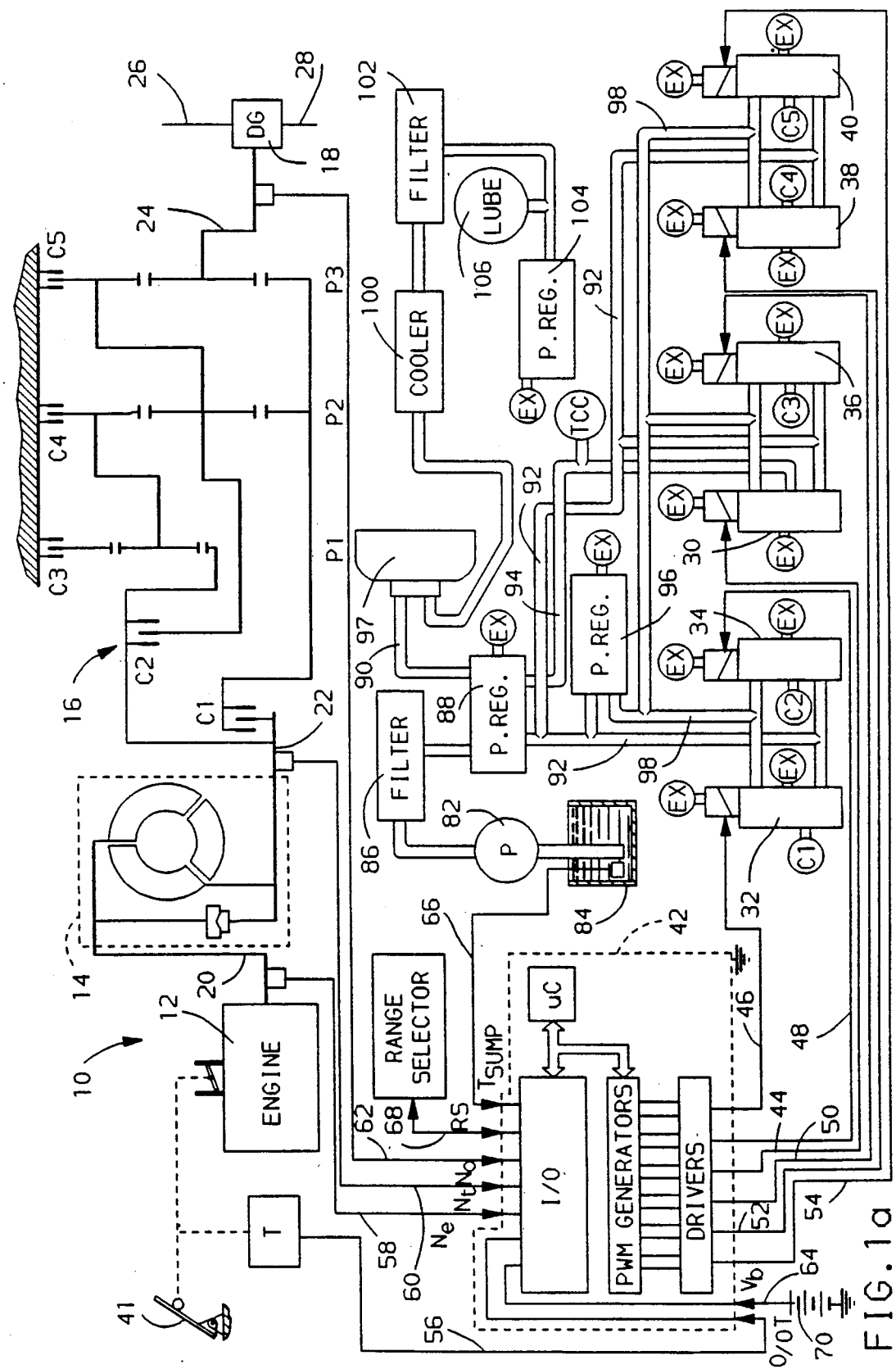
FIG. 1a is a system diagram of a fluid operated motor vehicle transmission, including several solenoid operated fluid pressure control valves and a computer-based control unit for carrying out the voltage control technique of this invention.

Referring now to the drawings, and more particularly to FIG. 1a, the reference numeral 10 generally designates a motor vehicle drive train including a throttled internal combustion engine 12, a fluidic torque converter 14, a six-speed fluid operated power transmission 16 and a differential gear set (DG) 18. The engine 12 is connected to the torque converter 14 via shaft 20, the torque converter 14 is connected to the transmission 16 via shaft 22, the transmission 16 is connected to the differential gear set 18 via shaft 24 and the differential gearset is connected to a pair of drive wheels (not shown) via the prop shafts 26 and 28.

Gear shifts are accomplished by selectively engaging and disengaging brakes and clutches, herein called torque transmitting devices or clutches. These clutches are actuated by hydraulic pressure and upon engagement require a fill time before torque is transmitted between a driving and a driven friction element.

The speed and torque relationships between the engine 12 and the drive wheels of the vehicle are controlled by a fluid operated torque converter clutch, designated TCC, and five fluid operated transmission clutches, designated C1-C5. The torque converter clutch TCC is selectively engaged by the solenoid operated control valve 30 to mechanically connect the impeller I and turbine T of torque converter 14. The clutches TCC, C1, C2, C3, C4, C5 are selectively engaged and disengaged by the solenoid operated control valves 30, 32, 34, 36, 38, 40 according to the diagram shown in FIG. 1b, to selectively establish a desired transmission speed ratio. The illustrated transmission gear set provides one reverse ratio and six forward ratios, and is described in detail in the U.S. Pat. 4,070,927 to Polak, issued Jan. 31, 1978, and assigned to the assignee of the present invention. An operator manipulated accelerator pedal 41 positions the engine throttle for controlling the engine power output.

The operation of the solenoid operated control valves 30-40 is controlled by a computer-based control unit 42 via lines 44-54 in response to various input signals representative of system parameters. Such inputs include an engine throttle position signal %T on line 56, an engine output shaft speed signal Ne on line 58, a torque converter output shaft speed signal Nt on line 60, a transmission output shaft speed signal No on line 62, a system supply voltage signal Vb on line 64, a transmission fluid temperature signal Tsump on line 66 and an operator range selector position signal RS on line 68. The system voltage is supplied by the storage battery 70, and the input signals are obtained with conventional electrical transducers such as potentiometers, thermistors and magnetic speed pickups.

Internally, the control unit 42 comprises a number of conventional devices including a microcomputer (uC) with internal clock and memory, an input/output device (I/0) and an array of PWM generators (PWM) and drivers (DR). As indicated below, a PWM generator and a driver (DR) are dedicated to each solenoid control valve 30-40. The PWM outputs are delivered to the respective drivers (DR) and are used to energize the respective solenoid control valves. The duty cycle of the PWM outputs determine the hydraulic pressure supplied by the solenoid control valves, with a low percent duty cycle yielding a low pressure and a high percent duty cycle yielding a high pressure for a normally closed valve.

The hydraulic circuit of transmission 16 includes a positive displacement pump 82 for supplying pressurized hydraulic fluid from the sump or reservoir 84, to the clutches TCC and C1-C5 through various hydraulic and electro-hydraulic valving mechanisms. After passing through a main circuit filter 86, the fluid output of pump 82 is directed to a main pressure regulator valve 88 which develops regulated fluid pressures in lines 90 and 92.

The fluid in line 90, generally referred to as converter feed pressure, is directed through the torque converter 14, as schematically designated by the converter shell 97. After passing through a cooler 100 and cooler filter 102, the converter fluid is then regulated down to a lower pressure by the regulator valve 104 and directed to the transmission lube circuit, as designated by the bubble 106.

The fluid in line 92, generally referred to as main or line pressure, is supplied as an input to the clutch control valves 30-40, and also to the control pressure regulator valve 96. The control pressure regulator valve 96 develops a somewhat lower pressure in line 98, referred to herein as the control pressure, such pressure being directed to the solenoid of each control valve 30-40.

The fluid in line 94, referred to as the converter clutch pressure, is supplied directly by solenoid 30 to the torque converter clutch TCC to engage the same. This pressure is also supplied to the main regulator valve 88 to provide a lower regulated line pressure in the converter lock-up mode.

Figures 1B, 2:
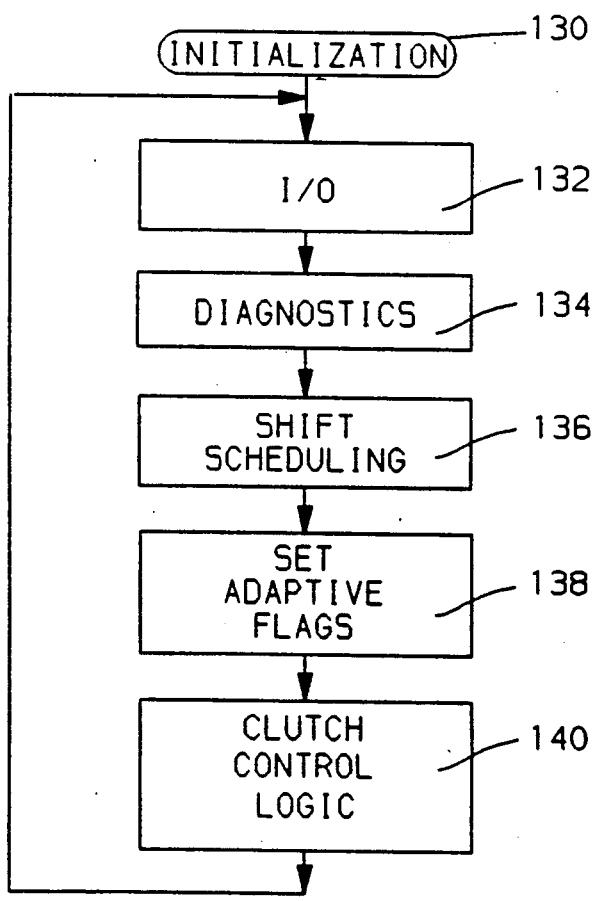

FIGS. 2, 3, 5 and 6 are flow diagrams representative of computer program instructions executed by the computer-based control unit 42 of FIG. 1 in carrying out the shift control technique of this invention. In the description of the flow diagrams other than FIG. 2, the functional explanation marked with numerals in angle brackets, <nn>, refers to blocks bearing that number.

FIG. 2 represents an executive or main loop program which directs the sequential execution of various subroutines. Block 130 designates a series of instructions executed at the initiation of each period of vehicle operation for setting the various timers, registers and variable values of control unit 42 to predetermined initial values. Thereafter, the blocks 132-140 are sequentially and repeatedly executed as indicated by the flow diagram lines. Block 132 reads the various input signal values and outputs the required control signals to the PWM generators and drivers for solenoid controlled valves 30-40. Blocks 13414 138 contain diagnostic, shift scheduling, and adaptive flag logic. The clutch control logic block 140 analyzes the various system input signals described above in reference to FIG. 1a, develops pressure command signals PCMD for application to the solenoid operated control valves at the next execution of block 132, and computes adaptive corrections based on the adaptive flags at shift completion. Block 140 also effects pulse-width-modulation of the solenoid drive voltage to carry out the pressure commands for specific shift operations. Block 140 is detailed in the flow chart of FIGS. 3a-3b.

Figure 3A:
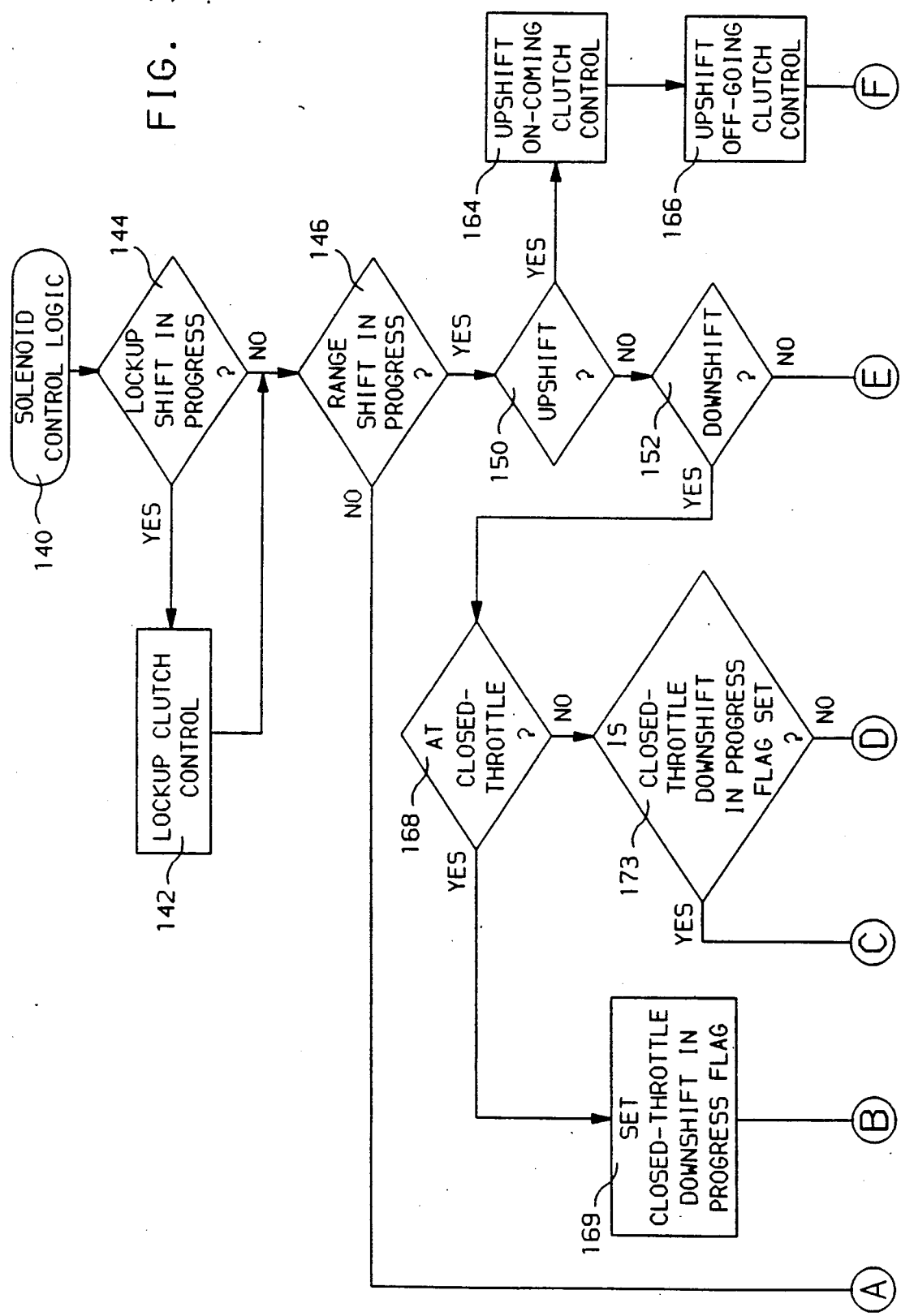
Figure 3B:
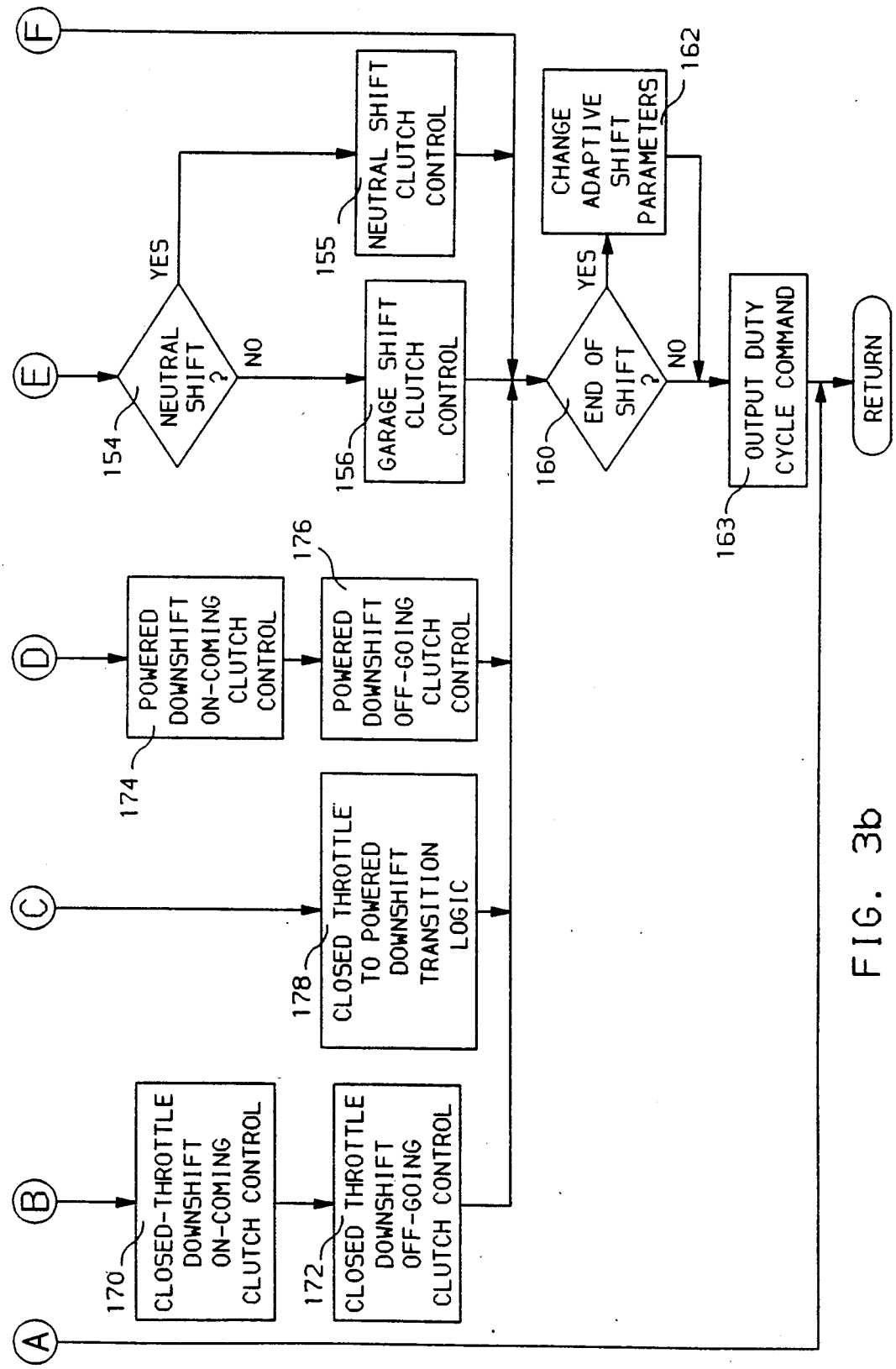

The flow diagram of FIGS. 3a-3b sets forth the program for making decisions as to the type of range shift in progress, if any, and determines the specific control for the on-coming and the off-going clutches. The program also checks whether a shift has performed within specifications, and if not, certain shift parameters are changed at shift completion according to predefined adaptive logic to correct the shift. First, lockup clutch control is executed <142> if a lockup shift is in progress <144>. Then it is determined (from the shift schedule) whether a range shift is in progress <146>. If not, the clutch control logic is exited. If a range shift is in progress <146>, it is determined whether it is an upshift <150>, a downshift <152>, a neutral shift <154>, or a garage shift <156>. A garage shift is a shift from neutral to either drive or reverse, or a shift from drive to reverse or from reverse to drive. The control flows from either the upshift, downshift, neutral shift or the garage shift block to the end-of-shift test <160>. Once the shift is completed <160>, adaptive shift parameters are changed if required <162> and the duty cycle command is output <163>. If the shift has not ended <160>, the duty cycle command is output <163> before returning to the main loop of FIG. 2.

If an upshift is indicated <150>, the upshift on-coming clutch control <164> and the upshift off-going clutch control <166> are activated. If a downshift is indicated <152>, it is next decided whether it is a closed throttle downshift or a powered downshift <168>. If it is closed throttle, a closed throttle in progress flag is set <169>, the closed throttle on-coming clutch control is activated <170> and the closed throttle off-going clutch control is activated <172>. If the downshift is not at closed throttle <168>, the closed throttle flag is checked <173>. If the flag is not set, the powered downshift on-coming clutch control <174> and the powered downshift off-going clutch control <176> are activated. If the closed throttle flag is set <173>, the throttle opened during the course of the closed throttle downshift and a transition to powered downshift may be necessary; in such case, the appropriate transition logic is invoked <178>. If the shift is a neutral shift <154>, the neutral shift clutch control executes shifts from drive to neutral or from reverse to neutral <155>.

Each control phase operates by setting pressures, pressure increments, times or other values to predefined calibrated values which are herein generally called "set", "preset", "given" or "certain" values. Each such value is chosen from a table of calibrated values for each specific transmission condition, throttle range and shift type. Thus, different values are supplied for upshift, downshift, etc. as well as each range shift, e.g., 1-2, 2-1, 4-3, 5-4, etc. Converter and lockup modes may also require separate sets of calibration values.

The clutch tie-up test logic is applied as a part of the off-going clutch control 166, 176 and 172 for each type of range shift. To illustrate the invention, the following description of the tie-up logic is given for the case of a closed-throttle downshift. It is understood, however, that the invention applies equally well to the other range shifts.

Figure 4:
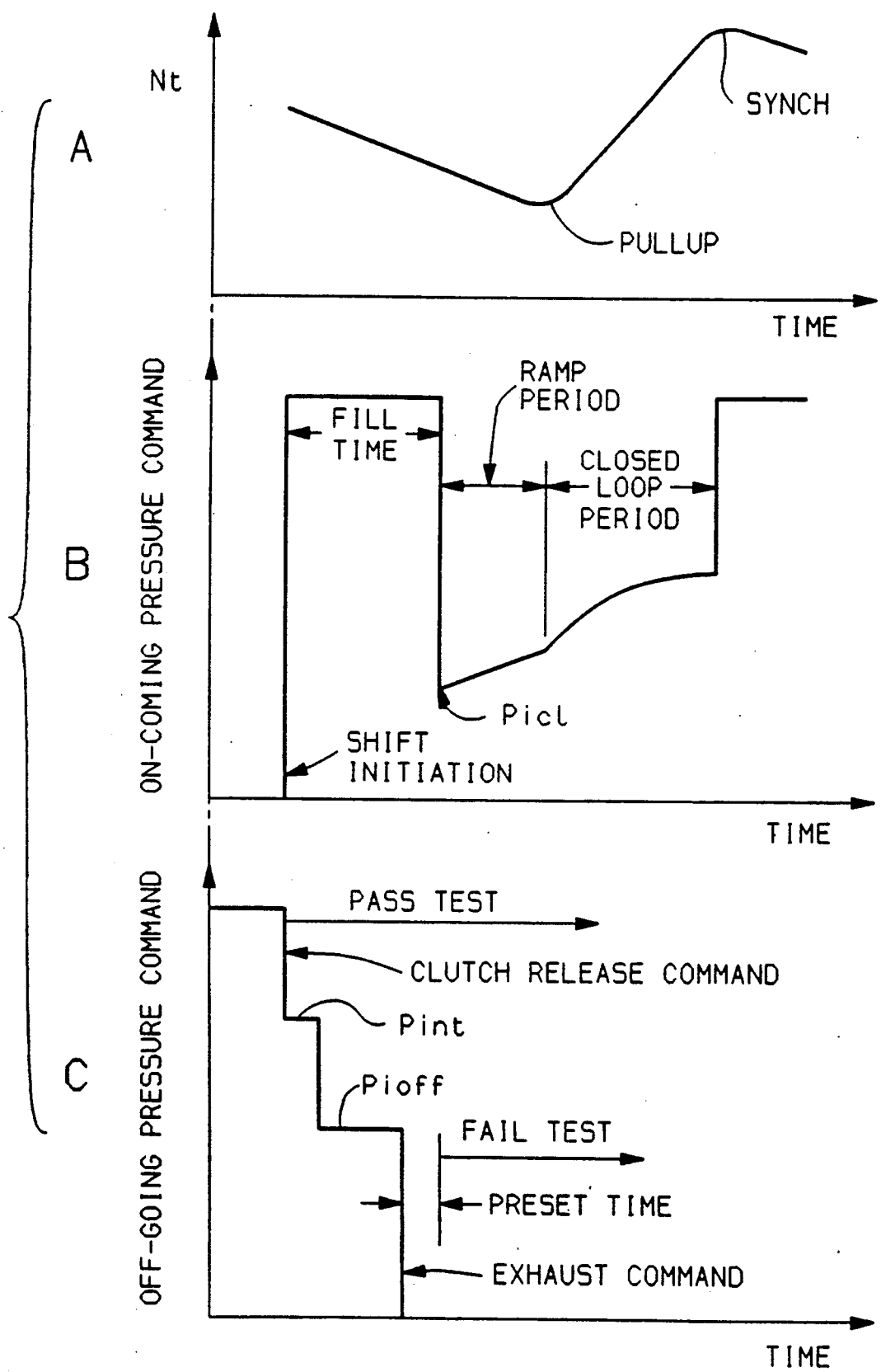
FIG. 4 graphs A, B and C are graphs illustrating turbine speed, on-coming pressure command and off-going pressure command, respectively, for clutch-to-clutch closed throttle downshifting.

FIG. 4, graphs A, B and C, respectively, show the turbine speed and the on-coming and off-going pressure commands for control of the on-coming and off-going clutches during a closed throttle downshift. At shift initiation, the on-coming pressure command is set to maximum for a fill time to prepare the on-coming clutch to accept torque. Also, at shift initiation, the off-going clutch release command is given. Then the off-going clutch pressure command is stepped to an intermediate value Pint for a set time and is then stepped to a lower value Pioff until a preset time before the end of the fill time. Thus, the fill time less the preset time determines the off-going clutch period. Then the off-going clutch is exhausted so that the on-coming clutch can take over when it is ready. The on-coming clutch pressure command is set to an initial closed-loop pressure Picl and then ramped up until slip of the off-going clutch (or turbine pullup) is detected. Turbine pullup is a result of the beginning of off-going clutch slip. Pullup is detected by the turbine speed becoming greater than the product of the output speed and the old or lower speed ratio plus a constant.

The off-going clutch slip triggers closed-loop control of the on-coming clutch pressure. The on-coming clutch slip is monitored and controlled to a calculated slip profile. This closed-loop slip profile control continues until on-coming clutch synchronization has been detected for several consecutive times. Then maximum on-coming clutch pressure is commanded to complete the shift.

Figure 5:
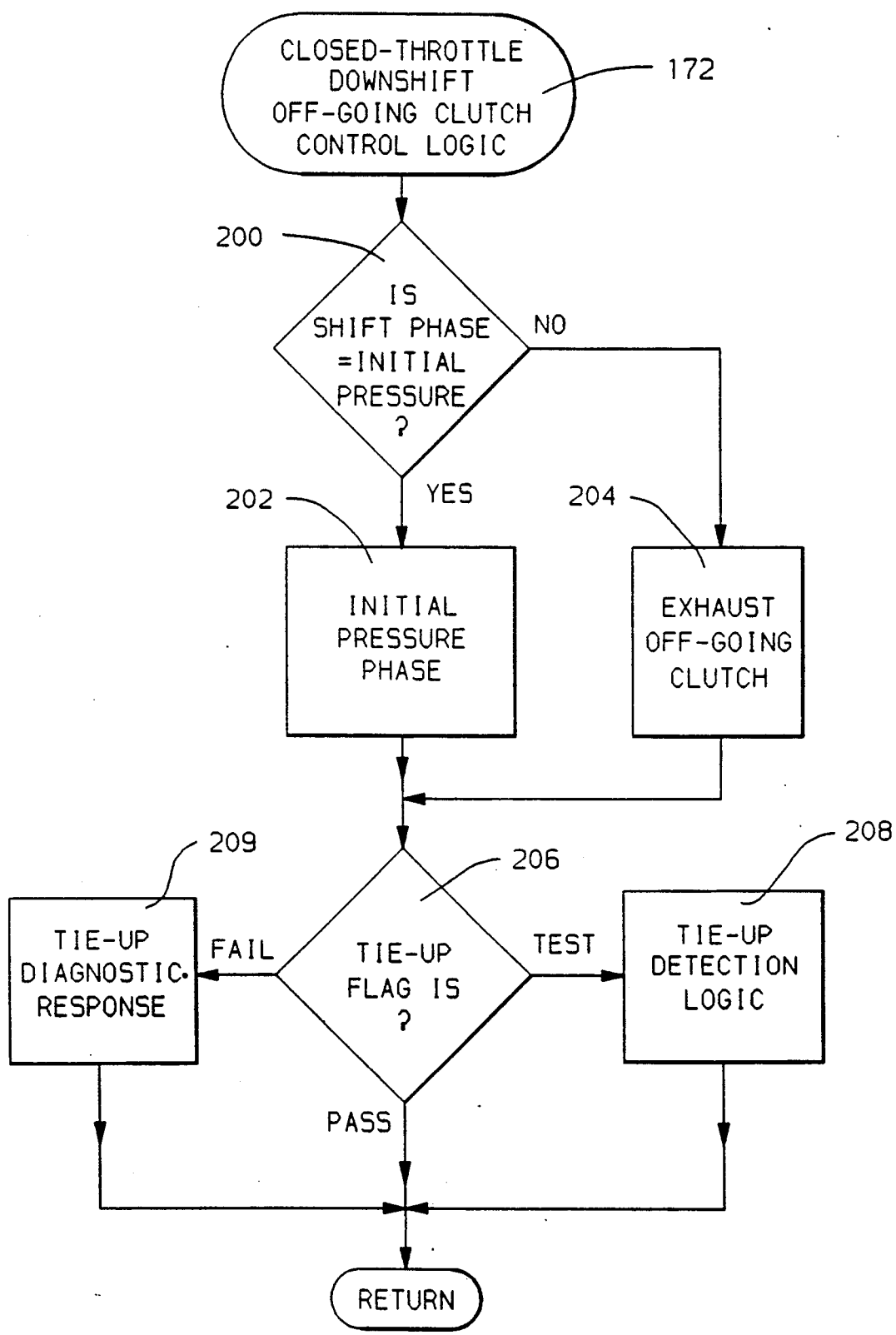
FIG. 5 is a flow diagram of tie-up test logic incorporated in a downshift control logic.

FIG. 5 is a flow diagram which illustrates how the tie-up detection logic is incorporated in the closed-throttle downshift off-going clutch control logic <172>. A SHIFT PHASE pointer is used to indicate the shift progress through different phases. If SHIFT PHASE equals INITIAL PRESSURE <200>, the Initial Pressure routine is run <202>. That entails setting the command pressure to the value Pint for a short preset period, and then to the value Pioff for a period which expires before the fill time runs out. When that period expires, SHIFT PHASE is set to EXHAUST so that the Exhaust Off-going Clutch command is implemented <204> and the off-going pressure command is set to zero to cause the off-going clutch to empty and lose torque capacity as soon as possible. Each time through the clutch control loop, the program flows to block 206 which queries whether the TIE-UP flag is set to PASS, TEST or FAIL. If it is set to TEST, the Tie-up Detection Logic is executed <208>. If the flag is set to FAIL, a Tie-up Diagnostic Response is executed <209>. The diagnostic response is generally involved with aborting the shift, i.e., returning to the previous range, and recording a code for diagnosis purposes. If the TIE-UP flag is set to PASS <206>, the tie-up detection is bypassed and the program flows to the main loop.

The tie-up detection logic is predicated on providing a definitive test result as soon as possible. Beginning at the off-going clutch release command, the logic looks for off-going clutch slip in a set number of consecutive loops and sets the TIE-UP flag to PASS when it occurs. This is indicated by a pass test region in graph C of FIG. 4. The clutch slip is defined by the turbine speed being outside a speed window which is the product of the output speed and the speed ratio of the initial range plus or minus a constant K1, or Nt outside of (No * SR)±K1. The TIE-UP flag is also set to PASS whenever turbine flare is detected during an upshift, flare being defined as Nt >(No * SR) +K2. The test is terminated when the flag is set to PASS.

Another test looks for a failure of clutch slip and is defined as turbine speed being within the same speed window, or Nt within (No * SR)±K1 for a set number of times. If that test is satisfied, the TIE-UP flag is set to FAIL. This test occurs only after the off-going pressure has had an opportunity to reach a sufficiently low pressure to release the off-going clutch. It is implemented a preset time after the off-going pressure command goes to zero and is shown as the fail test region in graph C of FIG. 4.

Figure 6:
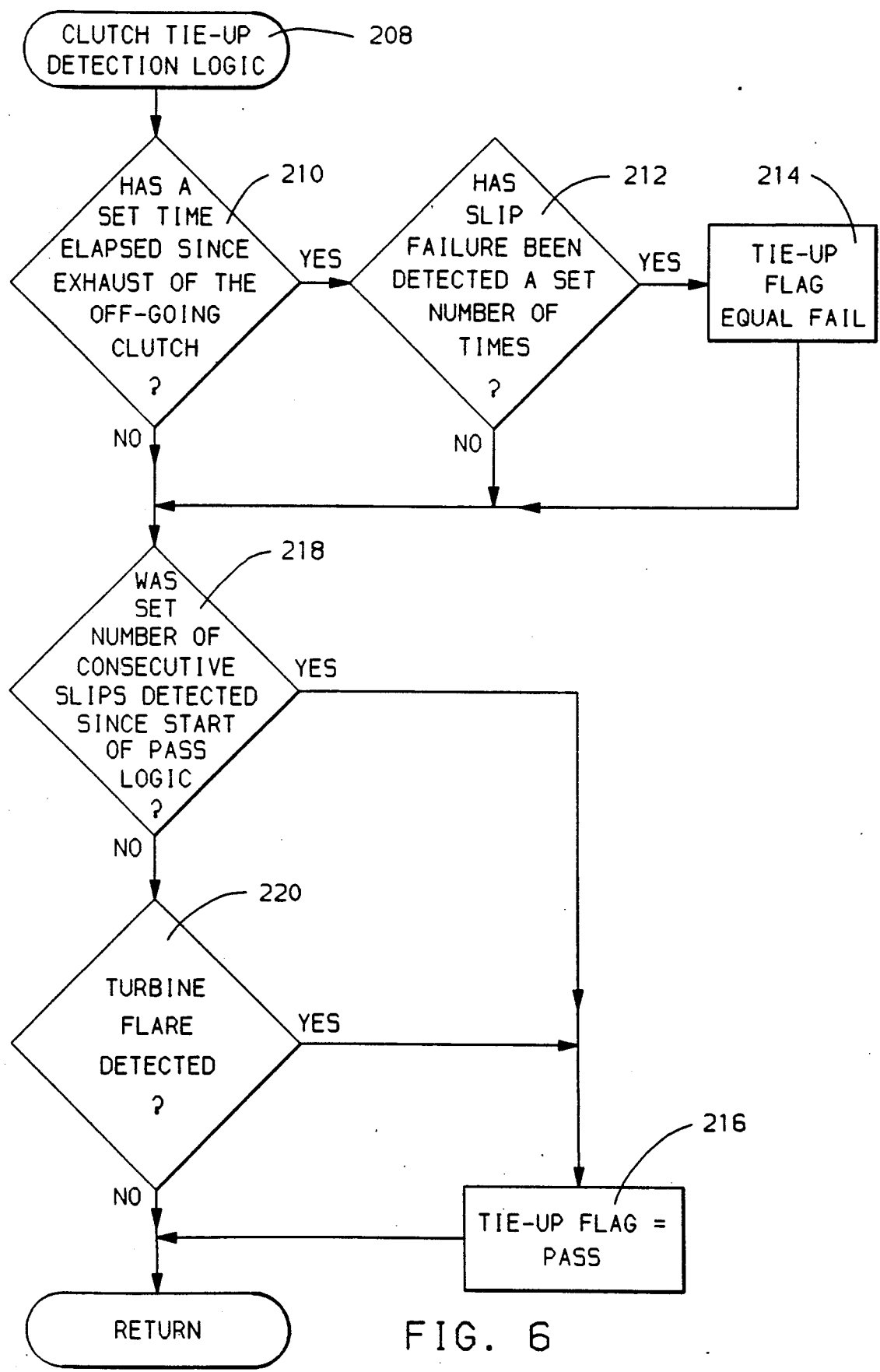
FIG. 6 is a flow diagram illustrating the tie-up test logic according to the invention.

The clutch tie-up detection logic <208> as shown in FIG. 6 begins by inquiring whether the preset delay time has elapsed after the exhaust command of the off-going clutch <210>. If it has, the failure test is initiated by determining if the slip failure has been detected a set number of times <212>. If it has, the TIE-UP flag is set to FAIL <214>. Then, the test pass logic routine is executed <216-220>. The TIE-UP flag is set to PASS <216> if the set number of consecutive slips have been detected <218> or turbine flare is detected <220>; if neither, the program returns to the main loop.

It will thus be seen that the pass testing makes a determination of no tie-up as soon as possible so that the on-coming clutch control can proceed without further regard to tie-up potential and that the fail testing provides a certain determination that off-going clutch release is not progressing properly and that the shift should not be completed.

While this invention has been described in reference to the illustrated embodiment, it is expected that various modifications will occur to those skilled in the art. In this regard, it should be understood that systems incorporating such modifications may fall within the scope of this invention, which is defined by the appended claims.

The embodiments of the invention in which an exclusive property or privilege is claimed are defined as follows:

1. In a vehicular automatic transmission having an input and an output, a turbine connected to the input to couple driving torque thereto, turbine and output speed sensing means, and electronic control means coupled to the outputs of the speed sensing means, in which a shift from an initial transmission range to a target range requires disengagement of an off-going fluid pressure operated torque transmitting device and failure of such disengagement results in a tie-up condition, and in which the device is controlled by an initial release command and a final exhaust command, the method of testing whether there is a tie-up condition of the off-going torque transmitting device comprising the steps of:

determining the absence of tie-up as soon as possible in a shift by periodically testing for slip of the off-going torque transmitting device from the time of the release command and issuing a pass indication when a given number of slip detections occur, periodically testing for the absence of slip beginning a set time after the exhaust command of the off-going device, and issuing a fail signal when the absence of slip is detected a given number of times, and terminating the testing when a pass indication is issued.

2. The invention as defined in claim 1 including the step of calculating the product of the initial range speed ratio and the output speed and defining a window centered at the calculated product, wherein slip is detected when the turbine speed is outside said window and the absence of slip is detected when the turbine speed is within the window.

3. In a vehicular automatic transmission having an input and an output, a turbine connected to the input to couple driving torque thereto, turbine and output speed sensing means, and electronic control means coupled to the outputs of the speed sensing means, in which a shift from an initial transmission range to a target range requires disengagement of an off-going fluid pressure operated torque transmitting device and failure of such disengagement results in a tie-up condition, and in which the device is controlled by an initial release command and a final exhaust command, the method of testing whether there is a tie-up condition of the off-going torque transmitting device comprising the steps of:

determining the absence of tie-up possible in a shift by periodically testing for slip of the off-going torque transmitting device from the time of the release command and issuing a pass indication as a function of slip detection, periodically testing for the absence of slip beginning a set time after the exhaust command of the off-going device, and issuing a fail indication as a function of the absence of slip, and terminating the testing when a pass or a fail indication is issued.

4. The invention as defined in claim 3 including the step of calculating the product of the initial range speed ratio and the output speed and defining a window including the calculated product, wherein slip is detected when turbine speed is outside the window.

5. The invention as defined in claim 3 including the step of testing for slip and the absence of slip by comparing the turbine speed to the product of the initial range speed ratio and the output speed.

6. The invention as defined in claim 3 further including the steps of:

when the shift is an upshift, detecting turbine flare by determining when turbine speed exceeds the product of output speed and the speed ratio of the initial range by a set amount, and generating a pass signal to indicate no-tie-up when turbine flare is detected.

* * * * *